May 7, 1957 P. M. FREEMAN 2,791,282
VALVE CONTROL FOR DUAL-ROTATION PROPELLER
Filed Sept. 15, 1953 2 Sheets-Sheet 1

INVENTOR
PHILIP M. FREEMAN
BY Harris G. Luther
ATTORNEY

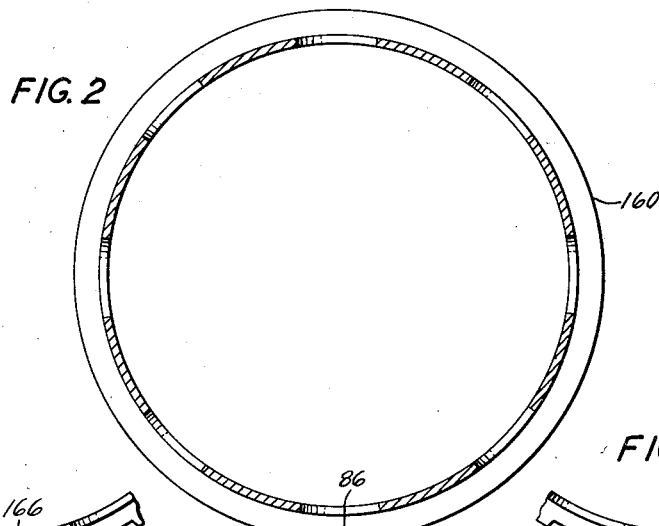
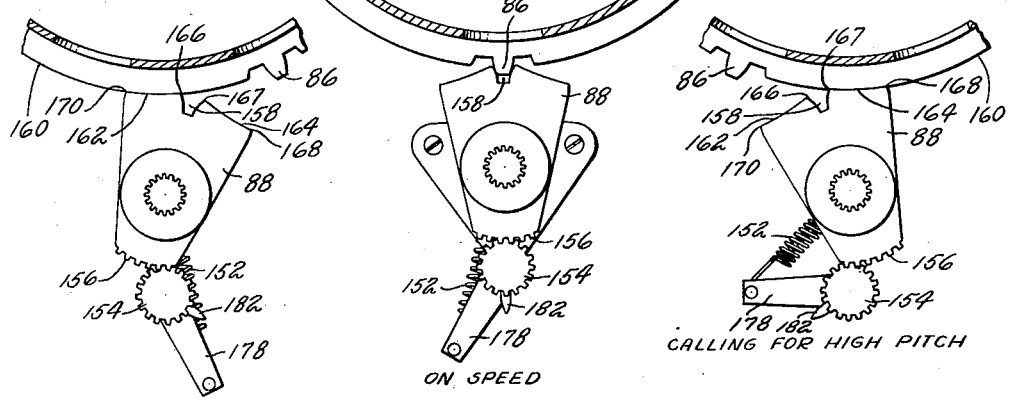
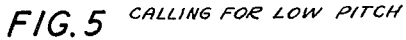
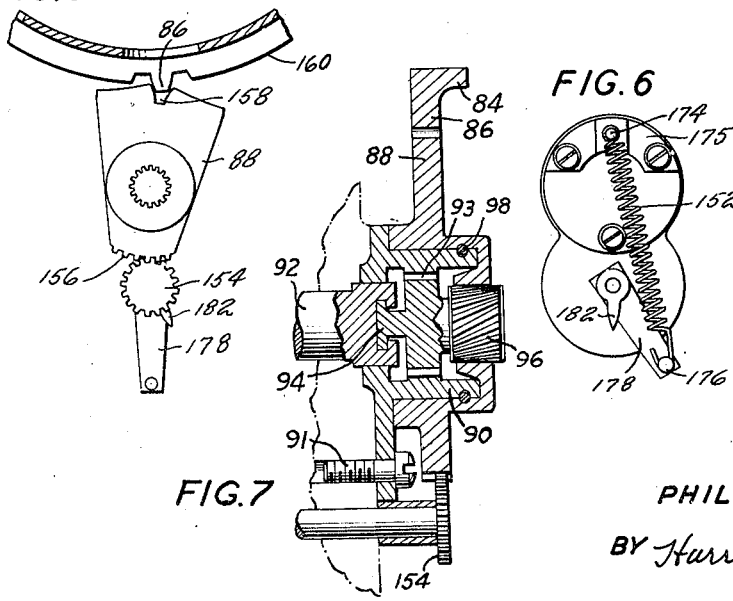

United States Patent Office 2,791,282
Patented May 7, 1957

2,791,282

VALVE CONTROL FOR DUAL-ROTATION PROPELLER

Philip M. Freeman, Farmington, Conn., assignor to United Aircraft Corporation, East Hartford, Conn., a corporation of Delaware Application September 15, 1953, Serial No. 380,235

10 Claims. (Cl. 170—135.27)

This application relates to control mechanism and particularly to control mechanism for the front propeller of a dual-rotation propeller.

An object of this invention is to provide simple and compact valve actuating mechanism.

A further object is the provision of a Geneva type valve actuating mechanism with means for eliminating backlash in the gear train including the Geneva type mechanism.

A still further object is the provision of mechanism for preventing the Geneva mechanism from locking upon reverse movement.

A still further object is the provision of a combined backlash eliminator and mechanism for preventing this Geneva mechanism from locking.

Other and additional objects will be obvious from the attached specification, claims and drawings in which Fig. 1 is a longitudinal cross sectional view through a dual-rotation propeller pitch control mechanism, partly in section and partly in phantom with sections taken along arbitrary planes to conveniently illustrate selected portions of the operating mechanism.

Fig. 2 is a partial section taken on the line 2—2 of Fig. 1 showing the valve actuating mechanism in centered position.

Fig. 3 is a partial section similar to Fig. 2 but showing the valve actuating mechanism in one extreme position.

Fig. 4 is a partial section similar to Fig. 2 showing the valve actuating mechanism in the other extreme position.

Fig. 5 is a partial section similar to Fig. 2 showing the position at which the preloading spring reverses its action.

Fig. 6 is a detail view taken along the line 6—6 of Fig. 1, showing preloading spring in the same position as Fig. 2.

Fig. 7 is an enlarged sectional view through the Geneva type gear and its connection with the valve spool.

Figure 1:
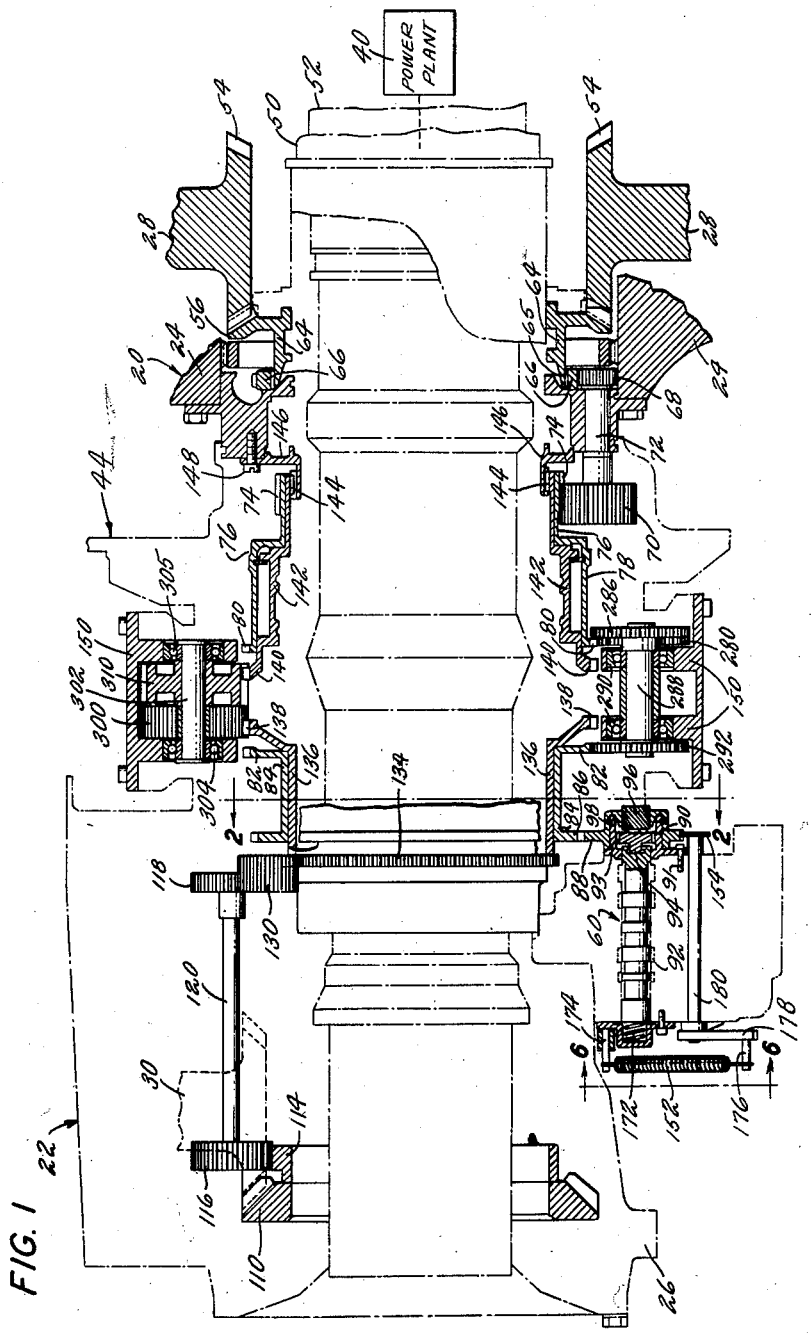

The invention has been illustrated herein in a dual-rotation pitch changing mechanism but it should be understood that it could be used in a single rotation propeller or in other rotating mechanism.

Referring to Fig. 1, a dual-rotation propeller is shown having an inboard unit generally indicated at 20, and an outboard unit generally indicated at 22, respectively, including hubs 24 and 26, respectively, and a plurality of blades 28 and 30 mounted for pitch changing movements relative to the hubs. The propeller units are driven by a propeller power plant 40 in opposite directions at a fixed ratio or equal speeds by well-known means omitted herein for convenience. The propeller units 20 and 22 include a mechanism therebetween interconnecting the propeller blades including a housing indicated generally at 44 which normally remains stationary during propeller rotation.

The pitch of the propeller blades 28 and 30 may be varied by fluid operated motors such as, for example, illustrated and described in patent application Serial No. 154,857, filed April 8, 1950, now U. S. Pat. No 2,667,229 by Arthur N. Allen, Jr.

In order to properly synchronize and coordinate the pitch changing movements of the blades of the several propeller units, it is desirable to provide a simple yet efficient interconnecting mechanism between these propeller units. To this end the inboard propeller hub 24 (Fig. 1) is driven by an outer shaft 50, while the outboard propeller hub 26 is driven in the opposite direction by an inner concentric shaft 52. The inboard hub 24 includes a blade interconnecting gear 56 meshing with gears 54 on the base of the blades 28 to synchronize the pitch changing movement of all the blades mounted on the hub 24. The synchronizing gear 56 is connected by means of a gear train, described in detail hereinafter, to the distributor valve indicated generally at 60 and located within the outboard hub 26. The distributor valve 60 controls the flow of hydraulic fluid to the pitch changing motors of the propeller blades 30 of the outboard hub 26 as described in detail in the above referred patent application, so that the pitch of the blades 30 will be varied in response to the pitch changing movement of the blades 28 of the inboard hub 24. The present invention relates to mechanism for operating said distributor valve and for preloading, or eliminating, the backlash from this gear train so that the pitch of the blades of the outboard propeller will closely follow the pitch of the blades of the inboard propeller. The blade synchronizing gear 56 of the inboard hub 24 includes a forwardly extending sleeve 64 which has a spline connection 65 with a ring gear 66 which in turn meshes with a gear 68 keyed to a shaft 72 journalled within the hub 24. Gear 68 drives another gear 70 by means of the common shaft 72. Gear 70 meshes with a ring gear 74 which is carried by a rearwardly extending portion of a freely rotatable sleeve 76 forming a part of the interpropeller connecting mechanism contained within the aforementioned housing 44. The sleeve 76 has a forwardly extending portion 78 which carries a ring gear 80. The ring gear 80 is connected with another ring gear 82 of a similar diameter by means of a plurality of reversing gears carried by the housing 44. These gears will, as long as the housing remains stationary, impart equal and opposite rotation to the gears 80 and 82. As will be explained later, housing 44 is normally stationary and hence gear 82 will normally be rotated at the same speed as, but in the opposite direction to, gear 80. The reversing gears comprise a gear 280 mounted on a shaft (not shown) which is freely rotatable in bearings carried by the wall 150 of the interpropeller housing 44. Gear 280 meshes with gear 80 and with gear 286 which is fixed to a shaft 288 mounted in bearings 290 in the wall 150 of the interpropeller housing 44. Gear 286 is axially spaced from gear 80 so as not to interfere therewith. Shaft 288 has a gear 292 fixed thereto to turn with gear 286. Gear 292 meshes with gear 82 to provide the reversing connection between ring gear 80 and ring gear 82. This gear train has been described as driving the gears 80 and 82 in opposite directions at equal speeds. This is true when the shafts 50 and 52 are driven in opposite directions at equal speeds but if the driving mechanism for the shafts 50 or 52 drives these shafts at some other ratio, the reversing gears just described will drive gears 80 and 82 at this other ratio.

The gear 82 is carried by a freely rotatable sleeve 84 which carries a one tooth gear 86 forming the drive gear for the Geneva motion and is located within the rear portion of the front hub 26. A slotted driven member or follower 88 cooperates with the one tooth gear 86 in such a manner that rotation of the gear 86 will cause member 88 to rock about its support 90 which is secured to the hub 26 as by studs 91. In order to transform the rotary motion of member 88 to reciprocating motion of the spool 92 of distributor valve 60, support 90 is provided with axially extending internal straight splines 93. A loose member having at one end a T slot connection 94 with spool 92, at an intermediate portion, a sliding spline connection with support 90 at 93 and at its other end, a spiral spline connection 96 with member 88 is adapted to slide axially in support 90 and carry spool 92 with it. Rotary movement of member 88 will, through the spiral splines 96, move element 94 axially. Member 88 is held against axial movement by a snap ring 98 connecting member 88 with support 90. Pressure fluid for the distributor valve and the pitch changing motor is provided by a pump (not shown) which is driven by rotation of the hub 26 as more fully described in application of Earl M. Frankland, Serial No. 162,728, filed May 18, 1950 now U. S. Pat. No. 2,679,907 for Stationary Interpropeller Housing.

The above described gear train connects the propeller blades 28 of the inboard hub 24 with the distributor valve 60 of the outboard hub 26. A similar gear train which will now be described interconnects the inboard hub 24 with the blades 30 in the outboard hub 26. The blades 30 being normally hydraulically locked by their pitch changing motor, unless the distributor valve is calling for a change of pitch, serve to anchor one end of the gear train and the hub of the inboard propeller 26 serves to anchor the other end of the gear train about to be described so that the housing 44 is fixed in space and held against rotation.

The blades 30 of the outboard hub 26 are all geared to the blade synchronizing gear 110 to maintain them in the same relative pitch positions. Synchronizing gear 110 is splined to a blade follow-up gear 114 which meshes with gear 116 fixed on shaft 120 which also carries a gear 118 thereon. Gear 118 meshes with idler gear 130 which in turn meshes with gear 134 carried at one end of a freely rotatable sleeve 136 which carries a ring gear 138 at its other end. Gear 138 is connected to a similar gear 140 by means of a reversing gear train. This reversing gear train is similar to the reversing gear train previously described and comprises a gear 300 meshing with gear 138 and supported on a shaft (not shown) in the housing 150 for free rotation. Gear 300 meshes with a gear 310 carried by a shaft 302 journalled in bearings 304 and 305 carried by the walls 150 of the housing 44. Gear 310 also meshes with gear 140 to provide the reversing connection between the gears 138 and 140. Gears 300 and 310 are wide gears and overlap each other so as to mesh with each other in the space between the gears 138 and 140. Ring gear 140 is carried by a freely rotatable sleeve 142 which is splined at 144 to a sleeve 146 fixed to the inboard hub 24 by means of bolts 148.

Summarizing, the two gear trains connecting the propeller blades of the two oppositely rotating propellers comprise one train connecting the hub 24 of the inboard propeller with the blades 30 of the outboard propeller and another train connecting the blades 28 of the inboard propeller with the distributor valve 60 of the outboard propeller. In the first train, the gear 140 being splined to the hub 24 is in effect fixed with respect to the outer drive shaft 50. The gear 138 being geared to the blades of the outboard propeller, which, except when the pitch is being changed, are hydraulically locked with respect to the outboard hub 26, is, in effect, fixed with respect to the inner shaft 52. The shafts 50 and 52 being geared together inside the engine to rotate at equal and opposite speeds will drive the gears 138 and 140 at equal and opposite speeds so that the reversing gears 300, 310 connecting gears 138, 140 will rotate on their own axes and have no tendency to rotate around the propeller shaft. These gears 300, 310 will therefore hold the housing in which they are mounted against rotation as long as there is no pitch change in the outboard propeller.

In the other gear train, which is the one which we are interested in in this invention, the gear 80 is geared to the propeller blades of the rear propeller, which, except when there is a pitch change of the propeller, are hydraulically locked to the rear hub 24, so that the gear 80 will in effect be fixed to the hub 24 and shaft 50 and rotate therewith. The gear 82, however, is freely rotatable. The reversing gears 280, 286 and 292 being mounted on shafts supported in a housing 150 held against rotation by the other gear train, as previously described, will rotate the gear 82 and hence the one tooth gear 86 at a speed equal and opposite to that of gear 80. It will be noted that this last gear train has a freely rotatable gear 82 as the last member. As more fully explained in application Serial No. 162,728 referred to above, pitch changing movement of propeller blade 28 will cause movement of gear 82 and the one tooth gear 86 attached thereto thus moving distributor valve 60 to change the pitch of the outboard propeller blades which pitch changing movement of the outboard propeller blade will move the gear 138 and hence the support 150 to return the distributor valve 60 to its inactive position.

It will be noted that the gear train connecting the inboard propeller blades 28 with the distributor valve 60 comprises about six sets of meshing gears and that one end of the gear train is free to rotate so that any backlash in this gear train would permit the distributor valve 60 to oscillate under the effects of vibration and thus cause continuous minute pitch changes of the outboard propeller.

In order to eliminate this backlash, I continuously load the gear train connecting the inboard propeller blades 28 with the distributor valve 60 and to also prevent the Geneva gears from locking, an overcenter spring 152 is connected to a gear 154 which meshes with gear teeth 156 (Fig. 2) cut into slotted member 88 so as to continuously urge the member 88 and the one tooth gear 86 in one direction during normal operation of the propeller. In normal operation, such as constant speed operation, the movement of the distributor valve 60 is very slight, being only sufficient to overcome slight changes in power absorbed by the propeller or delivered by the engine. During this time the slotted member 88 and the one tooth gear 86 will remain in substantially the position shown in Fig. 2 so that the spring 152 will constantly urge the one tooth gear 86 in one direction.

In the event of abnormal operation where large or fast pitch changes are required such that the propeller blades 28 will change their pitch so much or so rapidly that one tooth gear 86 will be moved out of the slot 158 of slotted member 88 i. e., out of driving relation to positions such as shown in Fig. 3 or Fig. 4, then the smooth surface 160 of the one tooth gear 86 will mesh with the concave surface 162 or 164 on member 88 and hold spool 92 in its maximum open position until the blades of the front propeller have changed to coincide with or assume a predetermined relation with respect to the pitch of the blades of the rear propeller. As shown in Fig. 3, when member 86 tends to return to a position in which its tooth will mesh with the slot 158, the corner 166 may have a tendency to dig in or bind on the surface 160. A slight drag especially if assisted by a spring action will cause this corner to start to dig in and once it has started, the members 86 and 88 act like a toggle and will lock, preventing further movement. It should be noted that the distance from the center line connecting the centers of members 86 and 88 to the corner 166 of the slot in Fig. 3 or corner 167 of the slot in Fig. 4 is much less than the distance from that center line to the corners 168 or 170 at the outside of the member 88. Hence this locking action tends to take place only on the corners 166 or 167. As shown in Figs. 2 and 4 the spring 152 will continuously urge member 88 in a direction tending to remove corner 167 from surface 160 of member 86 so that the spring action always tends to prevent the corner 167 from locking. When, however, the member 86 moves in the opposite direction as shown in Fig. 3, spring action in the same direction as that shown in Fig. 4 would tend to make corner 166 lock up upon return movement of member 86. However, as shown in Fig. 5, before the tooth of member 86 moves entirely out of the slot 158, i. e., as members 86 and 88 move out of driving relation, spring 152 moves across the center so as to urge member 88 in the opposite direction. The action of spring 152 is sufficiently stronger than the action of spring 172 described below so that before corner 166 contacts surface 160 spring 152 will overcome the action of spring 172 on member 88 and urge corner 166 away from the surface 160 of member 86 thus preventing the two members from locking up on reverse movement of member 86.

At this time the spring will tend to take the backlash out of the gear train in the opposite direction and hence the full effect of the backlash will be reflected in the position of spool 92. However, when the pitch change must be that rapid or that great, the effect of backlash is immaterial because the spool is open to its extreme position anyway.

A compression spring 172 continuously urges spool 92 to the right as shown in Fig. 1 to take out any backlash in the connection 94 or splines 93 and 96 and continuously urges member 88 in the same direction that it is urged by the spring 152 during normal operation.

Spring 152, which is a tension spring, is secured at one end by a pin 174 which is carried by a shoe 175, Fig. 6, which in turn is secured to the propeller hub 22 and at the other end is secured to a pin 176 extending from a crank 178 carried by shaft 180. Shaft 180 is mounted for oscillation in hub 22 and has a gear 154 secured on the end opposite crank 178. A pointer 182 is mounted on shaft 180 for rotation therewith to indicate the position of spool 92 as an aid in adjusting the propeller blades for their initial setting.

From the above it will be apparent that I have provided mechanism utilizing rotary motion up to the exact point of transfer to the reciprocating motion of the spool of the pilot valve and have also provided means for continuously preloading the gear train and the spool to take out all the backlash between the blades of the rear propeller and the spool of the front propeller and have also utilized a portion of this preloading mechanism to prevent the Geneva motion elements from locking upon a reverse movement of the elements.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. Propeller pitch control means comprising an axially movable valve spool, a gear train, a Geneva type gear and follower connected with the last gear of the train, spiral splines connecting said follower with said valve to transform rotary motion of the follower into axial movement of said spool, resilient means urging said spool axially to continuously urge said gear train in one direction, and additional resilient means normally urging said follower in the same direction.

2. In a Geneva type of motion having a driving member and a driven member, in which the driving member may pass beyond driving relation with said driven member in opposite directions, means connected with the driven member for urging it in one direction while the driving member is in driving relation with the driven member and when it passes beyond driving relation in one direction and means reversing the action of said urging means on said driven member when the driving member passes beyond driving relation with said driven member in the opposite direction.

3. A device as claimed in claim 2 in which the driving member is driven by a gear train and in which said urging means eliminates backlash in said gear train while said driving and driven members are in driving relation.

4. Valve actuating mechanism for an axially movable valve comprising a Geneva type mechanism having a driving and a driven member, means connecting said driven member with said valve and transforming the rotary motion of said driven member into axial translational movement of said valve, means continuously urging said valve axially to continuously urge said driven member in a predetermined rotary direction, an overcenter spring assisting said urging means when the members are in driving relation, and means for reversing the effect of said spring on said driven member when the members pass out of driving relation in a predetermined direction.

5. In a dual rotation propeller, a valve in one propeller, means connecting the blades of the other propeller with said valve for actuating said valve, said means comprising a Geneva type connection having a driving member connected with said blades, a driven member connected with said valve, and an overcenter spring connected with said driven member.

6. A device as claimed in claim 5 in which said connecting means includes a gear train connecting said driving member with said blades and said overcenter spring continuously urges said driving and driven members and the gears of said gear train in a predetermined direction to eliminate backlash while said driving and driven members are in driving relation.

7. In a dual rotation propeller having hydraulically actuated pitch changing mechanism for changing the pitch of one propeller, a reciprocable control valve carried by said one propeller for controlling said pitch changing mechanism, means connecting said valve with the blades of the other propeller, including a gear train, a Geneva type connection and spiral splines for transforming rotary motion of the Geneva type connection to reciprocating movement of said valve and means for eliminating the effect of backlash in said gear train, said Geneva type connection and said splines while the elements of the Geneva type connection are in driving relation.

8. A device as claimed in claim 7 including additional means for preventing said Geneva connection from locking upon reversal of movement of said Geneva connection while the elements of the Geneva type connection are out of driving relation.

9. A device as in claim 8 in which the driver of the Geneva type connection may pass out of driving relation with said driven member in opposite directions and in which the additional means comprises an overcenter spring for applying force to said driven member in the proper direction to prevent locking as said driving member returns to driving relation with said driven member from either direction.

10. Propeller pitch control means comprising a valve, a gear train, a Geneva type gear having a driving member, connected with and driven by said gear train, and a driven member, connected with said valve, said driving and driven members movable into and out of driving engagement, resilient means urging said driven member in one direction to eliminate backlash in said gear train and said Geneva type gear while said driving and driven members are in driving engagement.

References Cited in the file of this patent
UNITED STATES PATENTS

| | | |
|---|---|---|
| 2,253,183 | Le Count | Aug. 19, 1941 |
| 2,360,695 | Linden | Oct. 17, 1944 |